US009056577B2

(12) United States Patent
Corrigan et al.

(10) Patent No.: US 9,056,577 B2
(45) Date of Patent: Jun. 16, 2015

(54) APPARATUS AND SYSTEM FOR FACILITATING LOADING AND UNLOADING CARGO FROM CARGO SPACES OF VEHICLES

(75) Inventors: J. Kevin Corrigan, Burbank, IL (US); Colm K. Corrigan, Burbank, IL (US)

(73) Assignee: JKC Development, Inc., Burbank, IL (US)

( * ) Notice: Subject to any disclaimer, the term of this patent is extended or adjusted under 35 U.S.C. 154(b) by 768 days.

(21) Appl. No.: 13/344,883

(22) Filed: Jan. 6, 2012

(65) Prior Publication Data
US 2012/0177467 A1 Jul. 12, 2012

Related U.S. Application Data

(60) Provisional application No. 61/430,297, filed on Jan. 6, 2011.

(51) Int. Cl.
*B65G 67/00* (2006.01)
*B60P 1/52* (2006.01)
*B60P 1/38* (2006.01)

(52) U.S. Cl.
CPC .... *B60P 1/52* (2013.01); *B60P 1/38* (2013.01)

(58) Field of Classification Search
CPC .............. B60P 1/02; B60P 1/006; B60P 1/36; B60P 3/08; B60P 3/07; B60P 1/38; B60P 3/1033; B60P 1/26; B60P 1/003; B60P 1/52; B60P 3/1066; B64D 9/00; B64F 1/32; B65F 3/28; B65F 3/201; B65F 3/20; B61D 3/18; B61D 3/20; A01G 23/006; B65G 67/00; B65G 25/065; B65G 13/12; B65G 47/54; B65G 47/261; B65G 47/53; B65G 25/02; B62B 3/148; A01D 87/127; A01D 90/105; B60R 5/04; A61G 3/061; B62D 17/10; B62D 25/2054
USPC ......... 414/679, 352, 353, 509, 518, 519, 522, 414/525.1, 531, 532, 535; 198/809, 463, 3, 198/597; 105/422
See application file for complete search history.

(56) References Cited

U.S. PATENT DOCUMENTS 2,605,914 A     8/1952   Hala
2,666,666 A *   1/1954   Schneider et al. .............. 296/16
(Continued)

OTHER PUBLICATIONS

Tommy Gate—Liftgates—Rail Gate Series www.tommygate.com/gatemodels_rail.asp (Oct. 12, 2009) 1 pp.
(Continued)

*Primary Examiner* — Saul Rodriguez
*Assistant Examiner* — Glenn Myers
(74) *Attorney, Agent, or Firm* — Banner & Witcoff, Ltd.

(57) ABSTRACT

A vehicle cargo space includes a rear lift gate moveable between opened and closed positions to allow movement of palletized containers into and out of the cargo space. The cargo space has a substantially horizontal floor with first and second sets of laterally spaced, parallel, longitudinal tracks. The tracks extend from the front to the lift gate at the rear of the cargo space. At least one set of tracks is positioned transverse to the longitudinal tracks. The tracks slidably support cargo container pallets. A system of actuators, guides and locks enable programmed movement of the pallets along the tracks into and out of the cargo space as well as within the cargo space.

19 Claims, 8 Drawing Sheets

(56) References Cited

U.S. PATENT DOCUMENTS

| | | | | |
|---|---|---|---|---|
| 2,678,139 | A | * | 5/1954 | Gildersleeve ................ 414/522 |
| 3,346,132 | A | * | 10/1967 | Duszka ........................ 414/499 |
| 3,369,684 | A | * | 2/1968 | Ford ............................ 414/498 |
| 3,642,154 | A | * | 2/1972 | Duszka ........................ 414/522 |
| 3,853,230 | A | * | 12/1974 | Schultz ........................ 414/564 |
| 3,884,374 | A | | 5/1975 | Swallow, Jr. |
| 3,899,092 | A | * | 8/1975 | Nordstrom .................... 410/87 |
| 4,345,869 | A | | 8/1982 | King |
| 4,612,996 | A | * | 9/1986 | Wolf et al. ..................... 172/26 |
| 4,640,657 | A | | 2/1987 | Moore et al. |
| 4,642,018 | A | | 2/1987 | Leroux et al. |
| 4,684,311 | A | * | 8/1987 | Dickson-Wright et al. .. 414/535 |
| 4,715,765 | A | | 12/1987 | Agnoff |
| 4,909,378 | A | * | 3/1990 | Webb ............................ 198/721 |
| 5,213,467 | A | * | 5/1993 | Harms ........................ 414/572 |
| 5,511,922 | A | | 4/1996 | Sekiguchi et al. |
| 5,525,026 | A | | 6/1996 | DeMonte et al. |
| 5,542,809 | A | * | 8/1996 | Kita et al. .................... 414/528 |
| 5,605,427 | A | * | 2/1997 | Hammond .................... 414/276 |
| 5,794,416 | A | | 8/1998 | Rahman |
| 6,112,917 | A | * | 9/2000 | Baker et al. ................... 211/162 |
| 6,202,569 | B1 | | 3/2001 | Bailey et al. |
| 6,585,473 | B2 | * | 7/2003 | Turner ........................ 414/535 |
| 6,746,199 | B2 | * | 6/2004 | Carawan et al. ............. 414/535 |
| 6,814,214 | B2 | | 11/2004 | Warlow et al. |
| 6,935,248 | B2 | | 8/2005 | Warlow et al. |
| 8,561,946 | B2 | * | 10/2013 | Barmichev et al. ........ 244/118.1 |

OTHER PUBLICATIONS

Tommy Gate—Liftgates—Rail Gate Series—Platforms—www.tommygate.com/platforms_rg_bf.asp (Oct. 19, 2010) 1 pp.

Tommy Gate—Liftgates—Rail Gate Series—Features & Accessories—www.tommygate.com/features_rg_bf.asp (Oct. 12, 2009) 2 pp.

Waltco Lift Corp. Liftgates for trucks—www.waltcoliftgates.com/site.cfm/home.cfm (Oct. 19, 2010) 5 pp.

Maxon Lift www.maxonlift.com (Oct. 19, 2010) 2 pp.

Anthony Liftgates, Inc.—www.anthonyliftgates.com (Oct. 19, 2010) 2 pp.

Leyman Lift Gates—www.leymanlift.com/home.htm (Oct. 19, 2010) 2 pp.

* cited by examiner

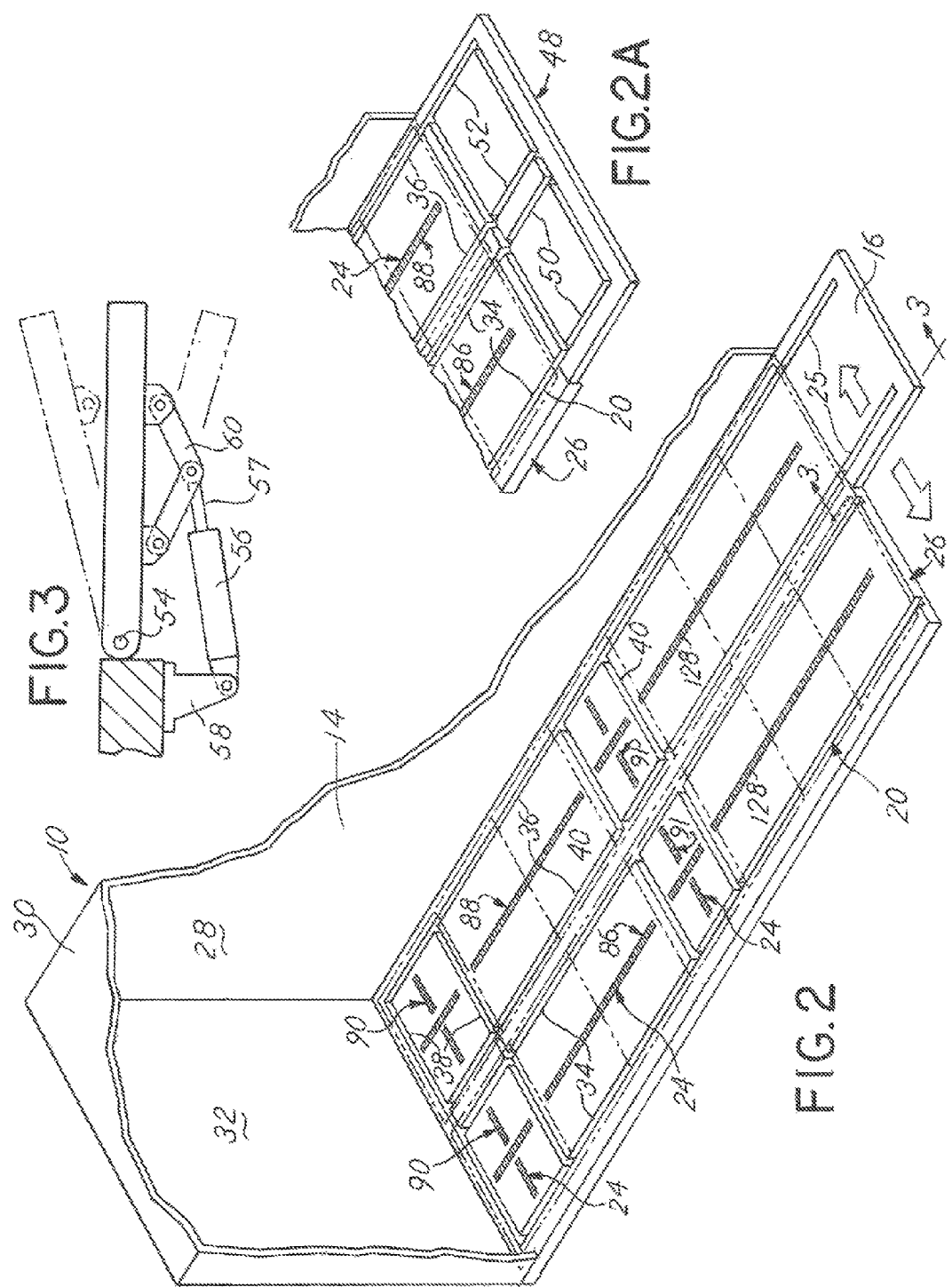

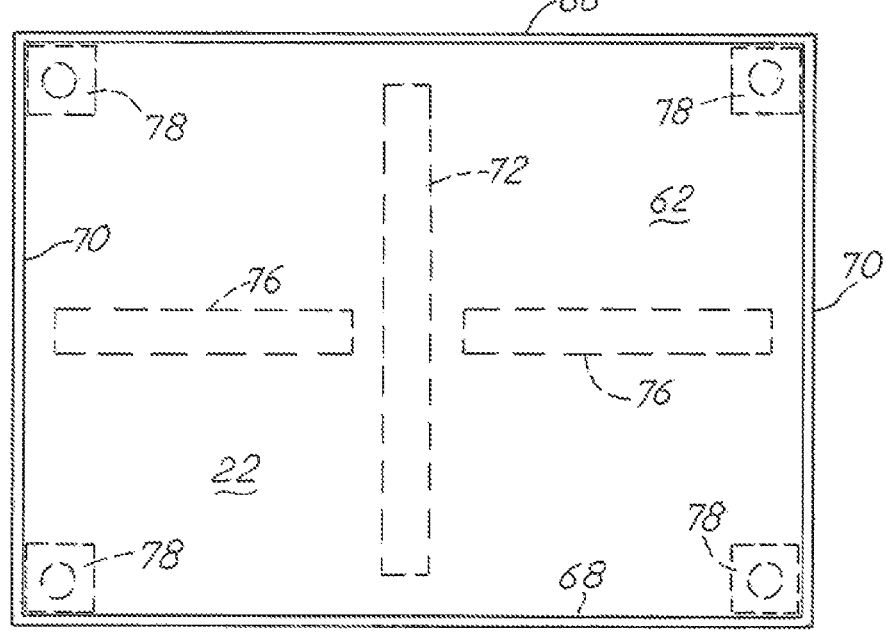
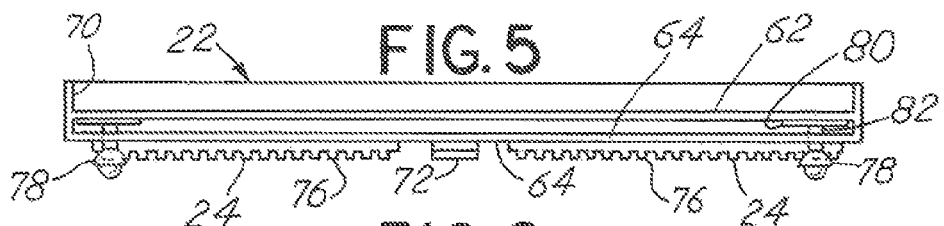
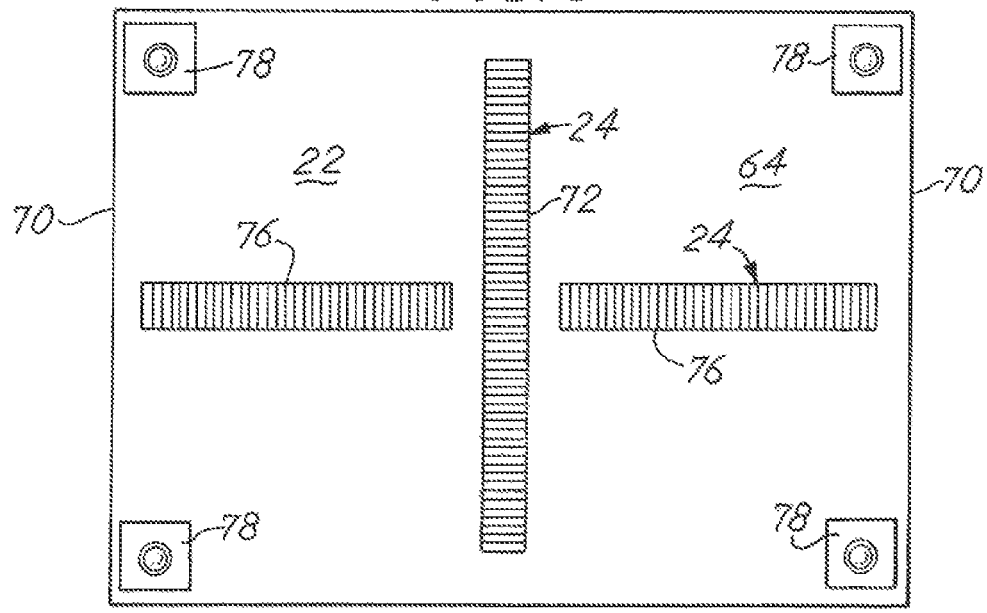

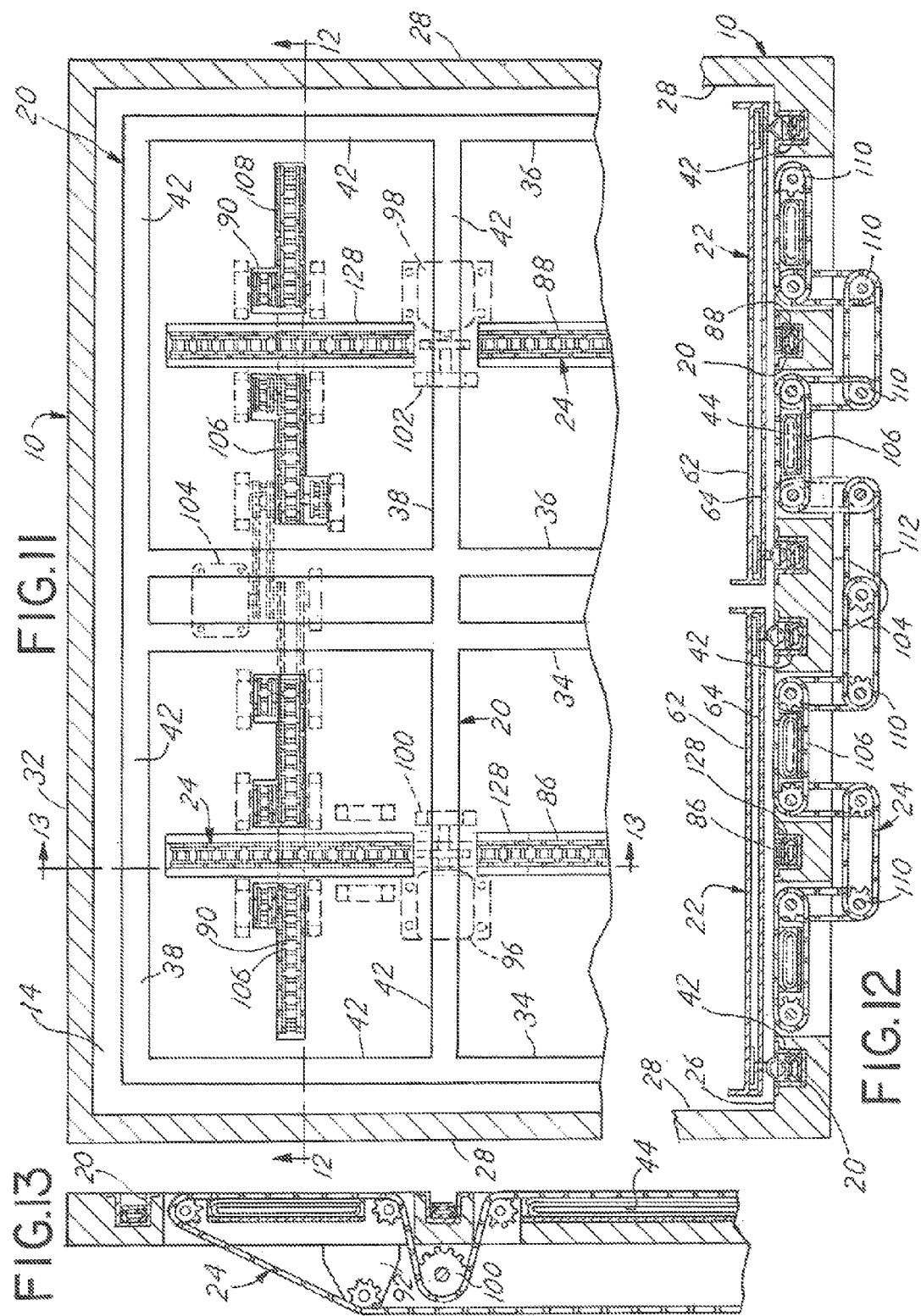

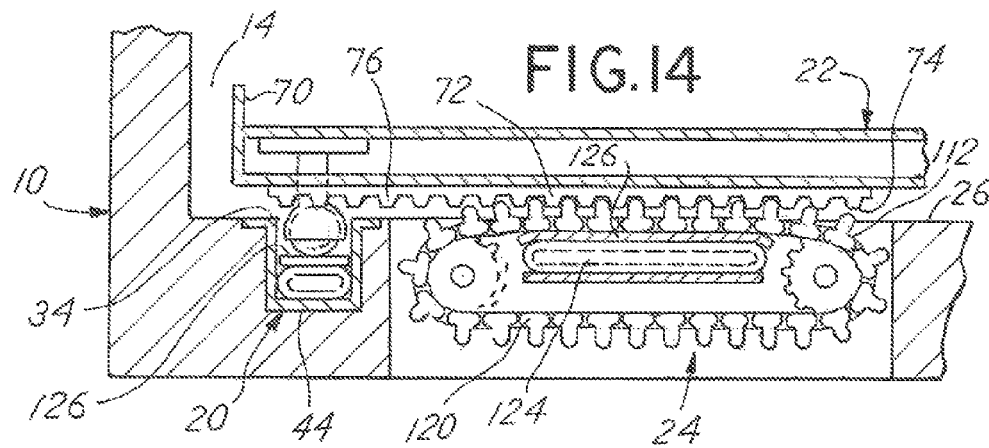
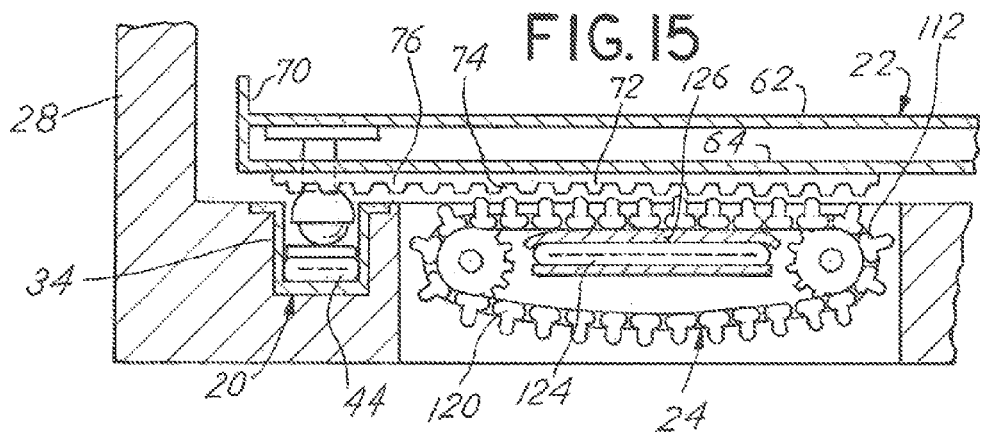
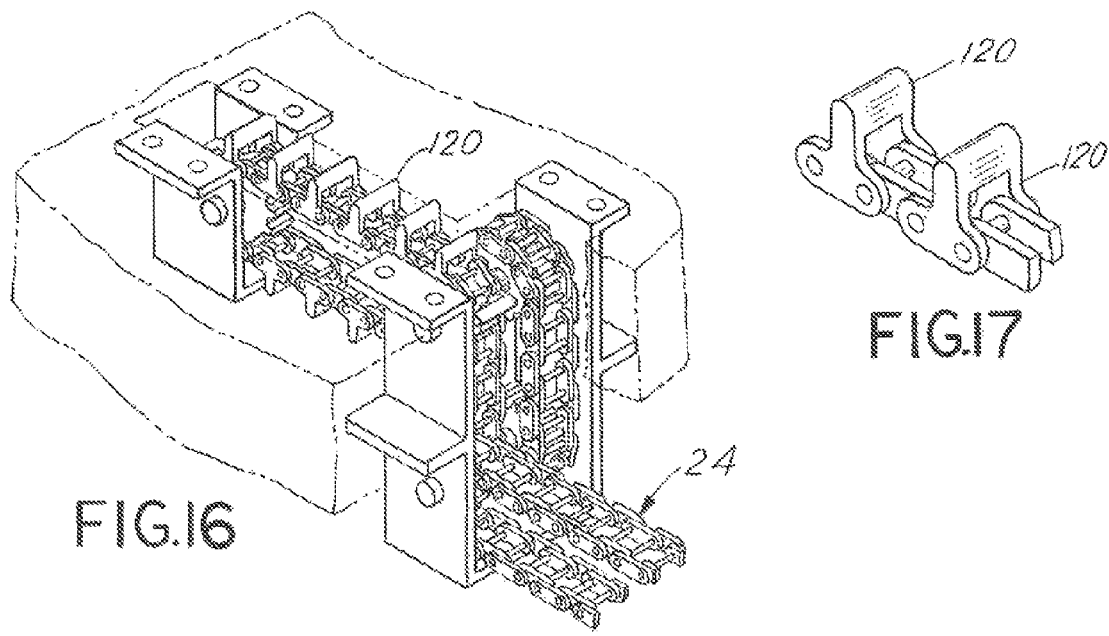

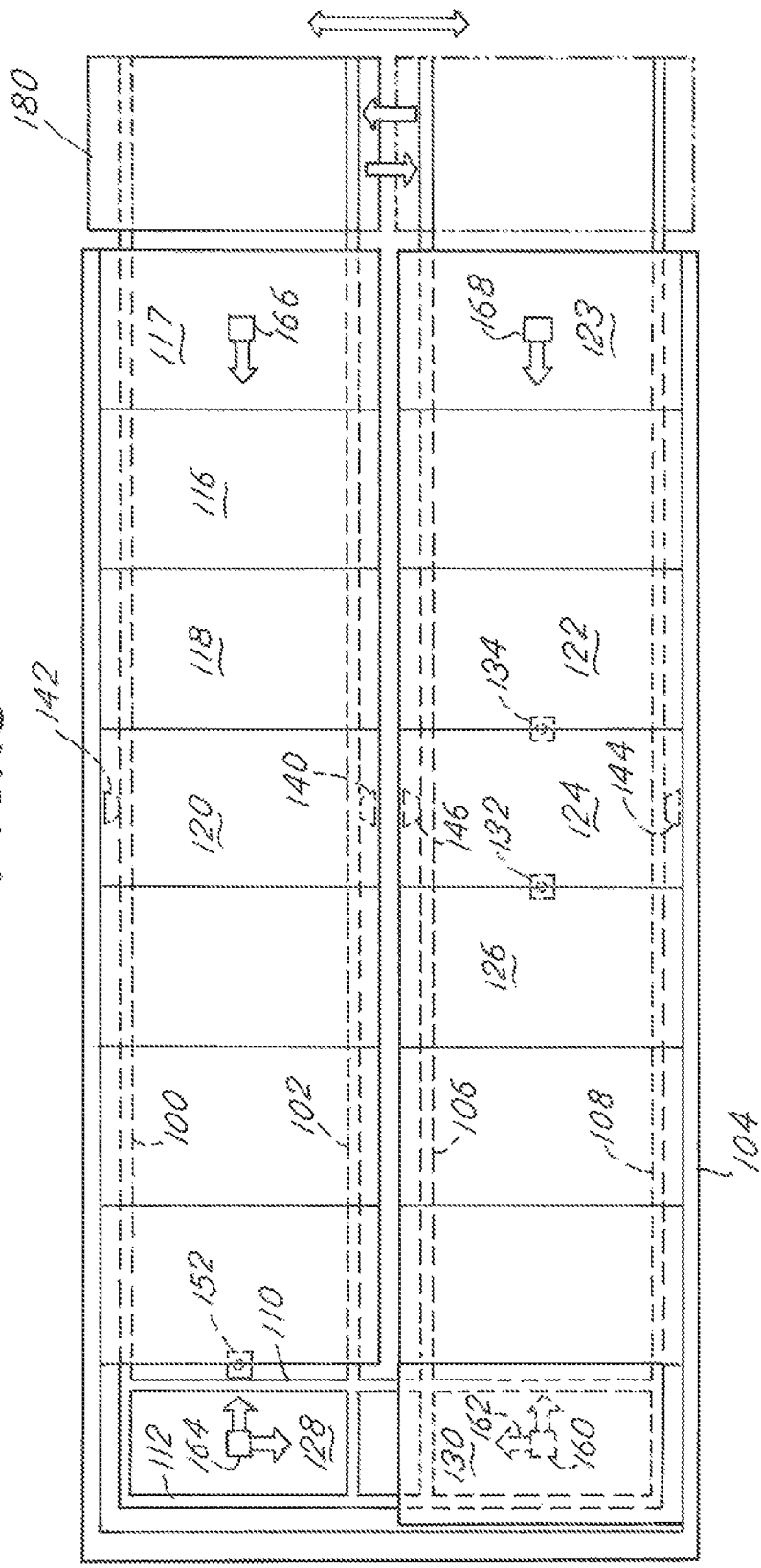

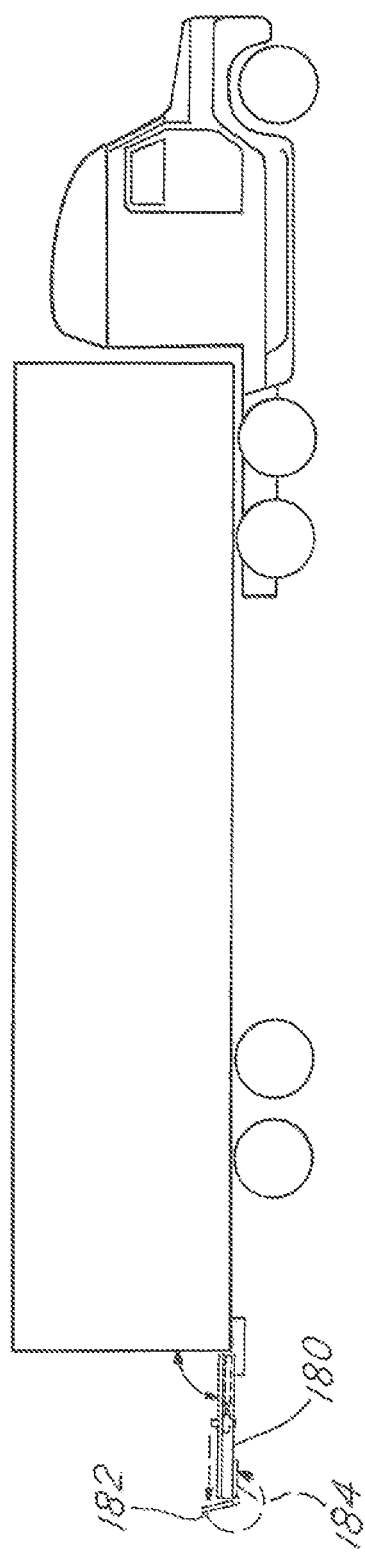

APPARATUS AND SYSTEM FOR FACILITATING LOADING AND UNLOADING CARGO FROM CARGO SPACES OF VEHICLES

CROSS REFERENCE TO RELATED APPLICATION

This is a utility application based on provisional application Ser. No. 61/430,297 filed Jan. 6, 2011 entitled "Apparatus and System for Facilitating Loading and unloading Cargo from Cargo Spaces of Vehicles" for which priority is claimed.

BACKGROUND OF THE INVENTION

This invention relates to an apparatus and a system for facilitating loading and unloading of packaged or containerized goods to and from cargo spaces utilized by a variety of delivery vehicles.

In today's society, there is wide use of vehicles of various types for loading and shipping goods from one or more locations to a delivery location or locations. The shipping industry has a wide variety of needs relating to loading products into a cargo space and ultimately unloading the product at the desired location. Some product shipments involve merely loading goods of the same type at one location and unloading all the goods at another location. In the trucking industry, this is known as TL (Truckload) trucking. However, other shipping needs, such as over the road trucking and certain local delivery trucking companies, require palletized or containerized products that do not have a truckload of the same products in the same cargo space. Such shipping requirements may require multiple pick ups of various products at various locations with drop offs of the products at multiple destinations. This is known as LTL Trucking (Less Than Truckload). Retailers often need to have loading of the cargo space of a vehicle at one or more locations and require shipping directly to multiple locations, such as grocery stores, businesses, and even households.

Most types of shipping needs are often difficult to be accomplished in an efficient and time effective manner. In the over the road trucking industry, for example, there is a need for improvements in both loading and unloading systems. It is always desired to load and unload cargo to and from the cargo space of a truck in a time effective manner. It is also desirable to provide a system and apparatus for organizing loads for sequential pick ups and drop offs. A system for effecting an off loading and loading sequence of a truckload from and to a cargo space is needed to provide improved efficiency and time savings in the trucking industry.

As one example, of the need for improvements in the loading and unloading of trucks, the food industry, in particular, would benefit financially from greater efficiency in loading and unloading pallets with containers of fresh and/or frozen food products to and from the cargo spaces of trailers used by the trucking industry. A container identification is provided for each pallet having containers thereon. In a given month, if a given trailer truck could make even one additional round trip starting at the home base, with multiple pick-ups and drop-offs at various sites, and returning back to the home base, significant monetary savings would result. The present invention is intended to provide an apparatus and a system which results in a highly efficient loading and unloading of cargo spaces of various types of vehicles.

The trucking industry, as represented by the American Trucking Association, is considered a major beneficiary of the inventive apparatus and system to be hereinafter described. In addition to the trucking industry, the invention is intended to be widely used by retailers, wholesalers, exporters, hotel and restaurant businesses, various business organizations and associations, and package and grocery delivery businesses. The U.S. government and state governments could well benefit from the present invention.

Benefits for the over-the-road trucking industry include: (1) eliminating or minimizing the need to completely unload and reload each trailer at a dock area; (2) minimize pallet movement (up to $50 per pallet for moving a single pallet at a dock area); (3) enables taking on back loads on outbound trips; (4) minimizing problems and costs created by product refusals.

Further, significant environmental savings may result from reduced fuel use (55 billion gallons of fuel are believed to be used annually by the trucking industry). This provides obvious environmental benefits.

Although the greatest beneficiaries of the present invention may be the trucking industry, the general concept provided by the invention may also be adapted for box trucks and vans engaged in the package and grocery delivery industries. In use by the package and grocery delivery industries, the inventive concepts remain substantially the same, although dimensional changes would be required.

SUMMARY OF THE INVENTION

Although any vehicle commonly used for shipping a large load of cargo may be utilized, the invention herein is particularly directed to use with vehicles having a large cargo space, such as a trailer of an over the road tractor trailer combination. The over the road vehicles commonly contain multiple cargo containers having various goods stored in palletized containers. The invention herein is particularly useful when the separate palletized containers are picked up from and dropped off at multiple locations.

The inventive apparatus and system has a cargo space commonly having a front side, a pair of laterally spaced sides, and a rear side. The rear side generally comprises a door that is moveable between opened and closed positions to allow movement of palletized containers in and out of the cargo space. The cargo space further has a substantially horizontal floor enclosed between the front side, the laterally spaced sides and a rear door. The inventive system and apparatus includes first and second sets of laterally spaced and opposed tracks that are securely mounted along the floor of the cargo space. The elongated tracks are positioned along each of the side walls and extend from the front side to the rear of the cargo space. Furthermore, at least one additional set of tracks is positioned transverse to the elongated tracks and is operably positioned relative to both the first and second sets of laterally spaced elongated tracks.

Multiple support carriages are provided with a generally horizontal support for movably supporting the cargo containers. Each of the support carriages has multiple wheel assemblies that are secured to the underside of the carriage for supporting containers, usually on pallets, in a substantially upright position. The wheel assemblies are sized, shaped and positioned for movement along the tracks. The wheel assemblies are engaged within both the longitudinal tracks and the transverse tracks.

Drive members are provided along all sets of tracks, that is, the longitudinal set of tracks and the transverse set of tracks. The support carriages are operatively interconnected to each set of the drive members. Further, a system is provided for moving the carriages between a raised mobile position and a lowered immobile position relative to the tracks so that the carriages with the containers, when in the raised position, are caused to be moved by the drive members from a first position to a second desired position along any of the longitudinal tracks and transverse tracks.

A container identification is provided for each of the containers. The containers are sequentially moved by an operator so that one or more of the containers are moved to a stored position or to an unloading position.

BRIEF DESCRIPTION OF THE DRAWING

In the detailed description which follows, reference will be made to the drawings comprised of the following figures:

FIG. 2 is a broken pictorial view showing the floor of the cargo space of FIG. 1 with laterally spaced and opposed sets of elongated tracks and a set of tracks at the front of the trailer transverse to the two sets of tracks and showing a laterally movable split lift gate;

FIG. 2A is a broken view similar to the lift gate section of the embodiment of FIG. 2 showing an alternate form of a lift gate;

FIG. 3 is a partial sectional view taken along the line 3-3 of FIG. 2 showing a mechanism for moving the lift gate;

FIG. 4 is a top plan view of one embodiment of a carriage for receiving the palletized cargo containers of FIG. 1;

FIG. 5 is a side elevational view of the carriage embodiment of FIG. 4;

FIG. 6 is a bottom plan view of a carriage embodiment illustrated in FIGS. 4 and 5;

FIG. 11 is a top plan, partially broken view, of sections of the drive members for moving the carriages;

FIG. 12 is a sectional view of the drive members taken along the line 12-12 of FIG. 11;

FIG. 13 is a sectional view of the drive members taken along the line 13-13 of FIG. 11;

FIG. 14 is an enlarged broken sectional view similar to the left side portion of FIG. 12 showing a portion of one carriage in a raised moveable position and in position to be moved by a drive member;

FIG. 15 is a view similar to FIG. 14 which shows a carriage in the lowered immobile position;

FIG. 16 is a detailed perspective view of a portion of the drive member; and

FIG. 17 is a pictorial view of cleats on the drive for engaging the underside of gear racks provided on the underside of each carriage; and FIG. 18 is a plan schematic view of an alternative design of an embodiment of the invention incorporating linear actuators, an alternative track system comprised of bearing races and a lift gate having side-to-side movement capability and vehicle to vehicle pallet movement; and FIG. 19 is a diagrammatic side elevation of an alternative or further embodiment depicting the alternative lift gate construction enabling transfer of pallets or packages between transport vehicles.

DETAILED DESCRIPTION OF THE INVENTION

Figure 1:
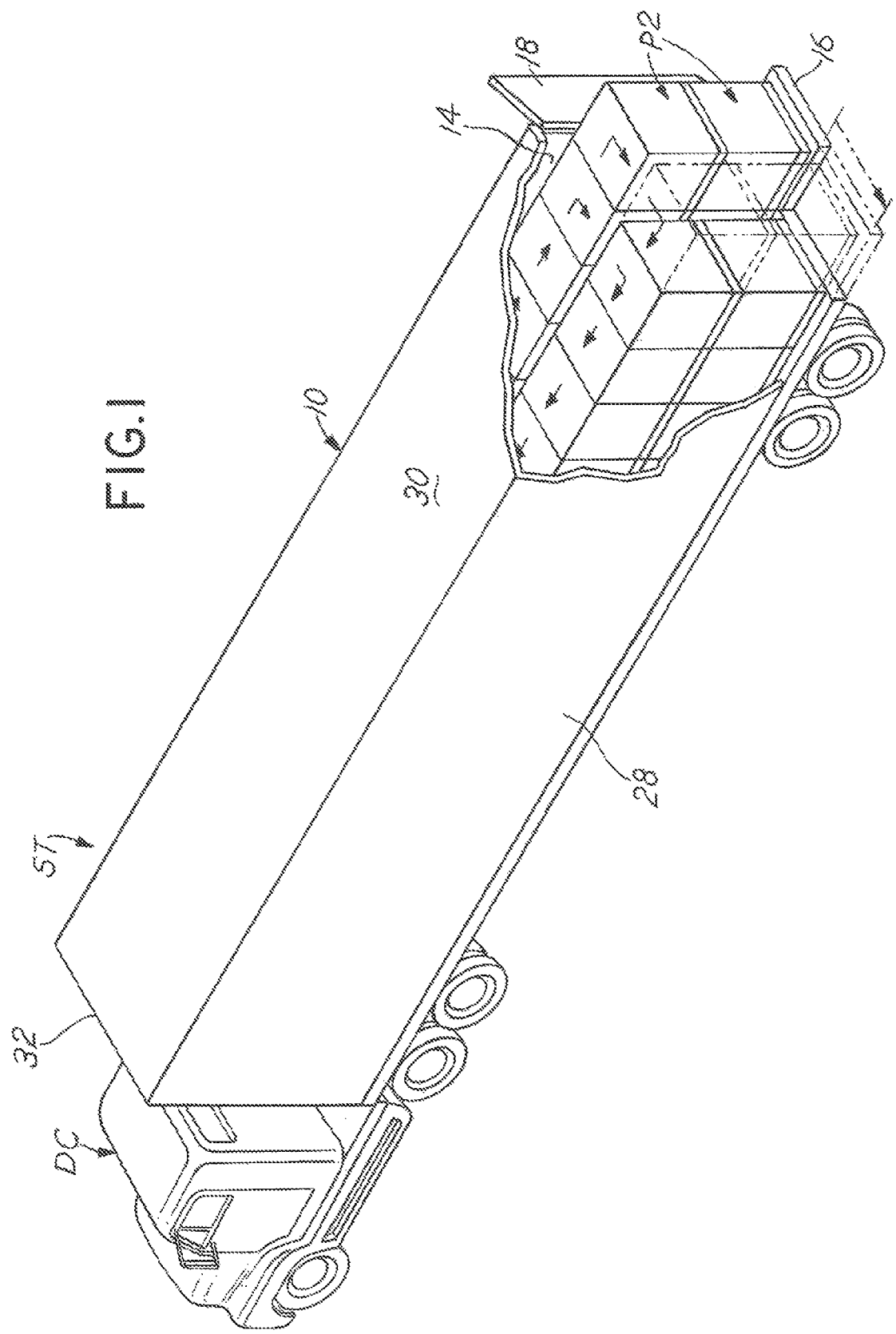
FIG. 1 is a pictorial view of a semi trailer truck carrier with the trailer carrying containers of products.

Referring to the attached drawings, particularly FIG. 1, the system and apparatus for facilitating loading and unloading of containers is shown. Specifically, FIG. 1 illustrates a semi-trailer truck ST having a driver cab DC used for pulling or carrying a rear trailer 10 in a conventional manner. The trailer 10 is shown in partially broken view at the rear part of the trailer 10. Product containers PC are schematically shown loaded in the cargo space, generally 14, of the trailer 10. The product containers PC are shown in a stacked position within the cargo space 14. One stacked set of containers PC is shown mounted on a half lift gate 16. The arrows shown in FIG. 1 illustrate movement of the product containers PC in a manner to be described hereinafter in greater detail. The trailer 10 is shown with a rear door 18 in the open position.

For purposes of simplicity, the product containers PC are shown generally as large boxes. The product containers PC consist of conventional products used in the shipping industry that are normally carried on pallets (not shown) of a conventional type, usually made of wood or plastic. It is to be understood that the product containers PC, as shown, consist of multiple containers secured by labeled shrink wrapping on pallets (not shown), that support the containers PC in a conventional manner. It is to be understood that the present invention is not to be limited to improvements in the cargo space 14 of the type shown in FIG. 1, that is, in a trailer. The present invention may be used in connection with any type of cargo space particularly when used in connection with vehicles of any type wherein pallets supporting product containers PC must be moved in and out of a cargo space with pick ups at various locations and with drop offs at various locations.

The present invention broadly consists of a track assembly, generally 20, shown best in FIGS. 2 and 2A, container carriages, generally 22, shown best in FIGS. 4-6 and a drive assembly, generally 24, shown best in FIGS. 11-17.

Track Assembly

Referring to FIGS. 1 and 2, the cargo space 14 of the trailer 10 has a floor, generally 26, a pair of laterally spaced upright side walls, generally 28, extending upwardly from the trailer floor 26, and a roof, generally 30. In addition, the cargo space 14 has a front wall 32. As indicated previously, a pair of hinged rear doors 18 (only one door being shown) are hingedly mounted to the upright rear of the side walls 28 for providing access to the interior of the cargo space 14. A half lift gate 16 is moveable about the rear of the floor 26 about a transverse, generally horizontal axis.

The track assembly 20 is securely mounted on the floor 26 of the cargo space 14. The track assembly 20 consists of multiple longitudinal and transverse tracks that are formed in the floor 26 of the trailer or in a retrofitted assembly mounted on the floor 26. For purposes of simplicity, the tracks are shown in the trailer floor 26. Specifically, the track assembly includes a pair of laterally spaced tracks, namely, left or driver side tracks 34 and passenger side or right side tracks 36. Both sets of tracks 34 and 36 extend from the front wall 32 back to the opening at the rear door 18. In addition, referring to FIG. 2, a front set of transverse tracks, generally 38, and a middle set of transverse tracks, generally 40, are shown in FIG. 2. Both the front set of tracks 38 and the middle set of tracks 40 intersect the elongated left side tracks 34 and the elongated right side tracks 36. Referring to FIGS. 12, 14 and 15, it is seen that the tracks 34, 36, 38 and 40 are all generally U-shaped in cross section and define an elongated cavity 42.

For reasons to be described hereinafter in greater detail, each of the tracks has an enclosed inflatable bladder resting in the bottom of the U-shaped cavity 42. The elongated bladders 44 have a closed interior that is interconnected to a source of air pressure such as commonly available either on the truck and/or in the dock area where the cargo spaces of trucks are commonly loaded and unloaded.

Referring to FIGS. 2, 2A and 3, the track assembly 20 further includes two alternate embodiments, one shown in FIG. 2 and the other shown in FIG. 2A. In the embodiment of FIG. 2, a half lift gate 16 is shown. A mechanism (not shown) is constructed and arranged to move the rear lift gate 16 laterally back and forth along the rear edge of the floor 26 of the trailer 10. The embodiment of FIG. 2 includes a pair of lift gate tracks 25 that are moveable into position for alignment with the right side tracks 36, as shown in FIG. 2, and for alignment with the left side tracks 34. Referring to FIG. 2A, a full lift gate, generally 48, is shown. The full lift gate 48 includes two sets of longitudinal tracks, namely, left side tracks 50 and right side tracks 52. The left side tracks 50 on the lift gate embodiment 48 is in direct alignment with both the rear end of the left side tracks 34 and the right side tracks 52 on the lift gate 48 and in direct alignment with the right side tracks 36. In addition, both the half lift gate 16 and the full lift gate 48 are moveable about a transverse substantially horizontal axis 54. A pressurized cylinder 56 is rotatably connected to the floor 26 of the trailer 10 by a bracket 58. The opposite, moveable end of the cylinder 56 has a rod 57 connected to a linkage 60 which is operatively connected to the underside of either the full lift gate 48 or the half lift gate 16. As will be described, the tilting of the lift gate 16 or 48 as shown in FIG. 3 assists in loading the containers PC into the cargo space 14, when in the upwardly angled position, and assists unloading the containers PC when in the marginally downward angled position to assist in the movement of the product containers PC out of the cargo space 14 of the trailer 10 since the tracks 50 and 52 are also marginally downwardly angled.

Container Carriages

Multiple carriers, generally 22, are provided for carrying the product containers PC. Each carriage 22 consists of an upper carriage floor 62 and a lower carriage floor 64. The upper floor 62 preferably has no openings, particularly when food products are being stored and moved on the carriages 22 so as to avoid moisture dripping on the tracks. As discussed previously, the product containers PC consist of conventional products carried on pallets (not shown). Since the carriages 22 receive the pallets, the rectangular carriage floors 62 and 64 are slightly larger than the exterior dimensions of a conventional pallet. Each carriage has a pair of spaced front and rear walls 66 and 68, respectively, and a pair of laterally spaced side walls 70 interconnected to the front walls 66 and 68. The walls 66, 68 and 70 of the upper carriage floor 62 are raised so as to secure the pallets within the package containers PC. The carriage floor 62 can be readily cleaned as by washing with a hose or the like.

The lower carriage floor 64 provides support for a downwardly facing gear rack 72 that extends below of the carriage 22. The gear rack 72 is spaced centrally of the side walls 70 of a carriage 22 and extends in front and rear directions near the front wall 66 and rear wall 68. The gear rack 72 includes teeth as seen best in FIGS. 5, 14 and 15 with the teeth facing downwardly to engage components of the drive assembly 24 to be hereinafter described in greater detail. A pair of transverse gear racks 76 are positioned between each of the side walls 70 of the carriage 22 and transverse to the central gear rack 72. The transverse gear rack 76 includes teeth similar to the teeth 74 of the gear rack 72. the gear racks 72 and 76 are constructed and arranged to be operatively engaged by the drive assembly 24 to provide transverse and longitudinal movement of the carriages 22.

The lower carriage floor 64 provides support for four universal wheel assemblies 78 of a conventional design that are received in the tracks 34, 36, 38, 40 and 25 of the track assembly 20. The wheels 78 are universally moveable in the track assemblies 34, 36, 38, 40 and 50 in forward, rearward and lateral directions. A support plate 80 for the wheels 78, as seen best in FIG. 5, is mounted on the underside of the upper carriage floor and passes through an opening provided in the lower carriage floor 64 of the carriage assembly 22. An upright shaft 82 secures the wheels 78 to the upper floor 62 of the carriage 22. As indicated previously, the carriages 22 are freely moveable within and along the tracks 34, 36, 38, 40, and 52. The carriages 22 are moved into the track areas from the rear of the floor of the cargo space 14 since members (not shown) prevent movement of the wheels 78 from upward movement. The number of carriages 22 used in combination with the track assembly 20 may vary depending on the number of loaded containers PC which are being moved along the track assembly. Generally speaking, the number of carriages 22 may equal the number of positions in the cargo space 14. If a carriage 22 is not being used, it may be stored within the cargo space, if desired, or it may be left anywhere in the cargo space without any product containers thereon.

Drive Assembly

The drive assembly 24 is constructed and arranged to move the carriages 22 along the track assembly 20 and also moves the containers PC on the carriages to a desired location, such as to a position for unloading or loading. The carriages 22 carry the product containers PC thereon, whether in single stack or a double stack, as shown in FIG. 1. Referring to FIGS. 1, 2A and 3, the drive assembly 24 consists of a left side/driver side drive chain 86, a right side/passenger side drive chain 88, a lateral or transverse front drive chain 90 in close proximity to the front wall 32 of the cargo space 14 and a lateral or transverse intermediate drive chain 91, at the intermediate portion of the elongated tracks 34 and 36, as seen in FIG. 2.

Referring to FIGS. 2 and 11-17, the left side drive chain assembly 86 and the right side drive chain assembly 88 extend from proximity to the front wall 32 of the cargo space 14 back to the rear of the floor 26 near the opening at the rear door 18. Each of the chain drives 86 and 88 are positioned centrally of and between the tracks of the left side 34 tracks and the right side tracks 36 and are positioned directly under the gear racks 72 carried on the underside of the carriages 22. Slots 128 are provided in the floor 26 so as to allow the drive chain to engage the racks 72 and 76 of the carriages 22. Multiple supports 92 are provided for multiple sprockets 94 for the chain drives 86 and 88. The sprocket supports 92 are mounted on the underside of the floor 26 of the trailer ST in enclosed chambers (not shown). A drive motor 96 is mounted on the underside of the floor 26 and is used to drive the left side chain drive 86. A drive motor 98 is mounted on the underside of the floor 26 and is used to drive the right side drive chain 88. A drive sprocket 100 is driven by the drive motor 96 for forward and reverse movements of the left side chain drive 86 and the right side motor 98 drives the right side drive sprocket 102 for driving the right side chain 88 in forward and reverse directions.

Referring to FIGS. 11 and 12, a drive motor assembly 104 is provided for movement of the carriages 22 along the front set of tracks 38. A separate drive (not shown) for the middle transverse tracks 40 operates in precisely the same manner as the movement of the carriages in the front side tracks 38 by a drive assembly (not shown).

Referring to FIGS. 11 and 12, a drive chain 106 is positioned centrally in a slot 108, in the floor 26 for the front side drive assembly 104. Multiple driven sprockets 110 and multiple chains 112 are provided. The sprockets 110 are supported by the floor 26 and the chains 106 are operatively interconnected to the sprockets 110. The sprockets 110 and the chains 112 are designed to pass under the longitudinal tracks 34 and 36 of the track assembly 20. The drive motor 104 is supported by the floor 26 and operates to drive the chain 112. The chain 112 is positioned centrally of the front tracks 38 and when a carriage 22 is in position, the chain 112 engages a transverse gear rack 76 carried on the underside of each of the carriages 22. A drive motor 104 is operated to move in left and right directions in order to move each carriage 22 between the left side tracks 34 and the right side tracks 36.

Referring to FIGS. 14 and 15, a drive chain 120 is positioned underneath the gear rack 72 and the teeth or cleats on the chain drive 120 engage the teeth 74 on the rack 76 on the underside of a carriage 22. A bladder 124 under the chain 120 is in communication with air pressure for expanding the bladder 124 to raise the chain 112 into the engaged position with a rack 72. Referring to FIG. 15, when the carriage is at rest, both the bladders 44 and 124 are deflated and the carriages 22 are lowered to a rested, immobile position.

It is to be understood that rig weight is a critical factor in the trucking industry. Overall weight of the truck is limited by law. The level of additional weight created by the apparatus 10 discussed above will come under intense scrutiny by the trucking industry as well as by government authorities. As a result, it would be appropriate that the main components of the apparatus 10, that is, the track assembly, generally 20, the container carriages, generally 22, and the drive assembly, generally 24 will at least have some components composed of a high density carbon fiber designed to minimize additional weight. The track channels, for example, may be lined with a light steel to reduce friction with the carriage wheels 78.

Operation of the Apparatus

As described above, the key elements of the apparatus 10 for facilitating loading and unloading of containers PC in and out of a cargo space 14 includes a preexisting cargo space having a floor 26, a front wall 32, and upright lateral side walls 28. The track assembly 20 can either be a permanent installation with the floor 26 of a cargo space 14 or, alternatively, the track assembly may be separately installed as a retrofit assembly.

As described above, the longitudinal left side tracks 34, right side tracks 36, transverse front tracks 38 and transverse middle tracks 40 are non-moveable parts of the overall system. Even though the various tracks are immobile, the bladders 44 extend longitudinally for the entire length of the tracks 34 and 36. Similarly, the bladders 44 extend for the entire length of the tracks 38 and 40. All of the bladders 44 communicate with an air pressure source (not shown). The bladders 44 in the tracks 34, 36, 38 and 40 vertically expand under pressure and cause the carriages 22 to be raised from the lowered position of FIG. 15 to the raised position of FIG. 14. A rigid elongated strip 126, preferably of metal, rests on top of the bladders 44 and are interposed between the bladders 44 and the wheel assemblies 78. The strips 126 facilitate movement of the wheels 78 along all of the tracks of the track assembly 28.

The carriages 22 for the product containers PC are moveable in both forward and rearward directions along the elongated tracks 34 and 36 and along the transverse tracks 38 and 40. The wheel assemblies 78 of the carriages 22 ride along all of the tracks and are supported by the elongated strips 126 while moving in the tracks 34, 36, 38 and 40. The carriages 22 are driven by the drive assembly 24. Specifically, the movement along the left side tracks 34 and right side tracks 36, the left side chain drive 100 and the right side chain drive 102 is accomplished by the cleats or teeth 120 carried by the chain drives engaging the gear racks 72 or 76. For transverse movement of the carriages 22, the cleats or teeth 120 of the chain drive 106 cause transverse movement of the carriages 22 from one side of the cargo space to the other by the chain drive 106 engaging the transverse racks 76 of the carriages 22.

Referring to FIGS. 14 and 15, the bladders 124, which are connected to an air pressure source, are activated to raise the drive chains to maintain driving interconnection between the gear rack 72 or transverse gear rack 76 of the carriages 22 by the cleats or teeth 120 engaging in the teeth of the gear racks 72 and 76. FIG. 14 shows the carriage 22 in a raised mobile position. Referring to FIG. 15, the bladder 124 is deflated as is the bladder 44 carried within the tracks 34, 36, 39 and 40 when the carriages are in an immobile position. Engagement is always maintained between the cleats or teeth 120 carried by the chain drives of the drive assembly 24 and the teeth of the gear racks 72 and 76 of the carriages 22.

Practical Operation

As further explanation of the invention, an example of the manner of using the improved system for loading and unloading semi trailers cargo space with pallets of product containers PC will be described.

In the trucking industry, every pallet having product containers PC thereon is labeled separately by its trailer position as shown on the driver's manifest. Labels are provided indicating the products involved, for example, green for fresh food, red for frozen food, and perhaps yellow for dry food. The labels also indicate "top load only" for some containers, such as a confectionary product, that could be damaged if loaded under a heavy container PC. The labels can be used for identifying stored positions for a handheld computer. Generally, almost all pallets with multiple layers of containers PC will be shrink wrapped with the identifying label on the inside or outside of the shrink wrap.

First, when loading the trailer with carriages 22, the shipping handlers will load the containers PC on the carriages 22 which are positioned with wheels in the tracks 34, 36, 38 and 40. An operator, normally the driver of the semitrailer truck, will use the handheld computer or even a smart phone to identify the stored position of a given carriage 22 having one or two levels of product containers PC thereon. The carriages 22 are loaded at the rear of the floor of the cargo space. When the carriage 22 with its product container PC load reaches its resting position, the operator identifies the location. The same thing happens with each product container PC until the cargo space 14 is partially or completely filled. The operator then has a complete memory of the container locations stored on a handheld computer (not shown) for purposes of unloading. The loading of the truck cargo space may occur on both the left side tracks and the right side tracks. If a split lift gate 46 is being used, the lift gate will be moved laterally between the left side tracks 34 and the right side tracks 36. The carriages 22 with containers PC may be moved transversely along the front transverse tracks 38 or the middle transverse tracks 40.

After the loading has been completed, and delivery is to be made at a delivery location, the operator proceeds with unloading at least one pallet of product containers PC. As in the core of loading, the carriages 22 are unloaded at the rear of the cargo space by a fork lift. The lift gates are used only for movement of product. As discussed above, during the movement of the carriages 22 on the tracks 34, 36, 38 and 40, the bladders 44 and 124 have been raised to a mobile position by a pressure source to allow the carriages 22 to move along the tracks both transversely and longitudinally. A power source, usually the truck itself, is provided to operate the drive assembly. The drive motors 104 are electrically operated by a power source. Drive motors are interconnected to switches (not shown) which are manually operated. For the longitudinal movement of the carriages 22, switches (not shown) are provided with three positions, that is, off, forward and reverse. Similarly, a three-position switch will be provided for each of the drive motors for the movement of the carriages 22 along the transverse tracks 38 and 40. Similarly, simultaneously with moving the carriages the bladders 44 and 124 are raised so as to lift the carriages 22 to the raised mobile position of FIG. 14. The pressure source (not shown) is operated by an on/off switch. The operator operates a series of switches provided at a location, usually on a side wall 28 near the rear door 18 opening of the cargo space 14.

Figure 7:
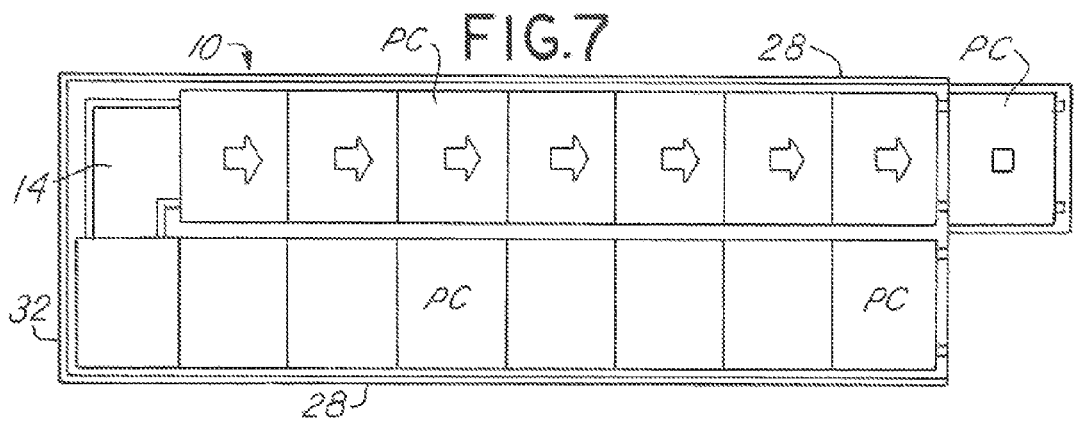
FIG. 7 is a top plan view showing movement of containers carried by carriages along the tracks by operation of a drive assembly.
Figure 8:
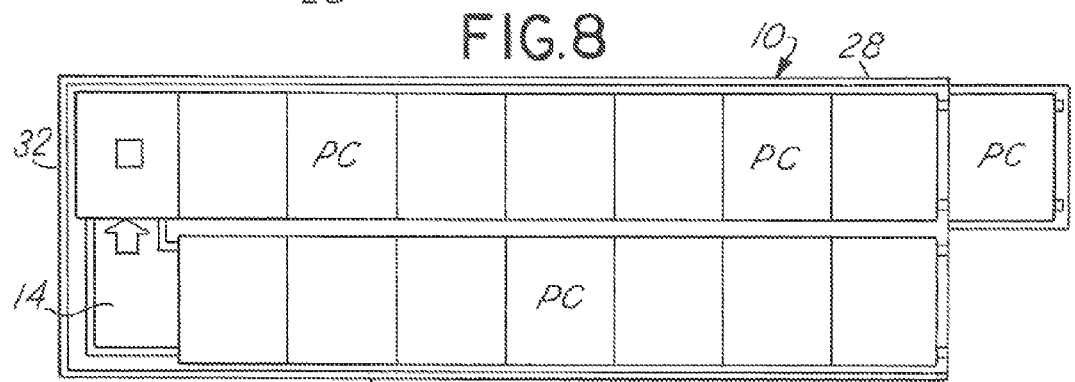
FIG. 8 is a top plan view, similar to FIG. 7, showing movement of a container into an open space as shown in FIG. 7.
Figure 9:
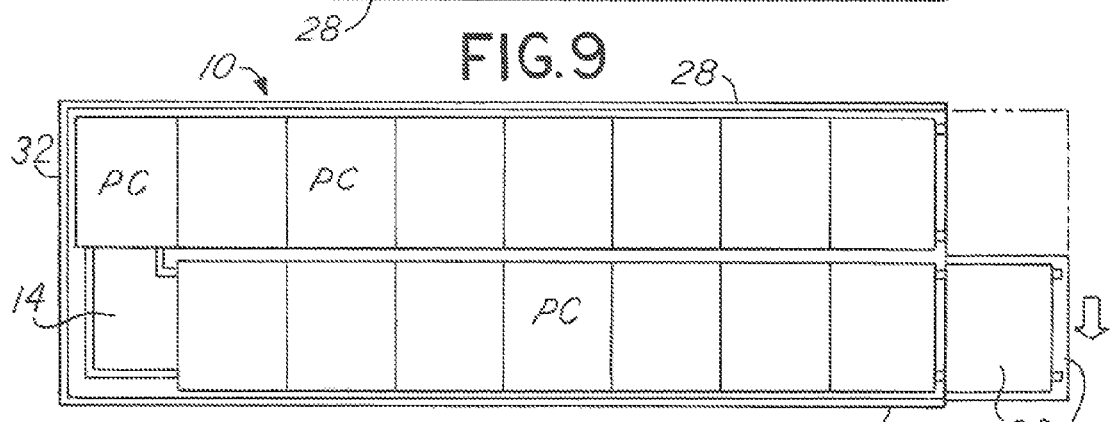
FIG. 9 shows a container on the split tail gate moved to a second position.
Figure 10:
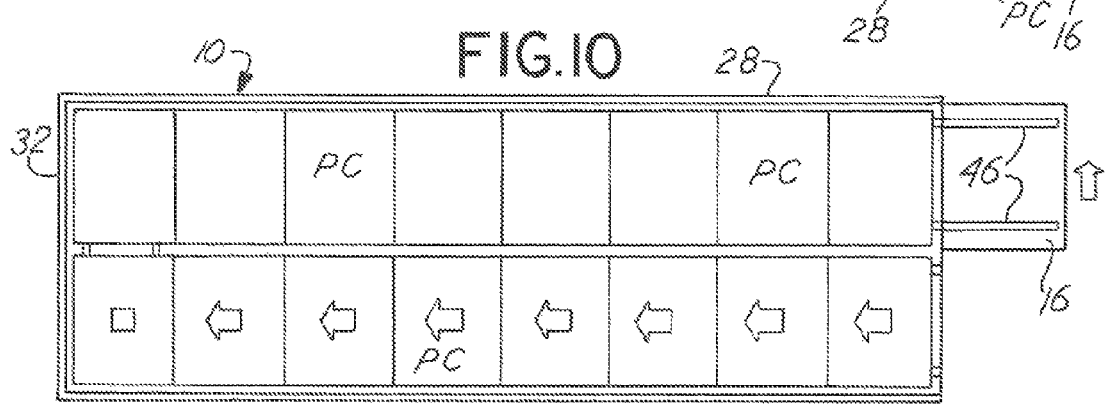
FIG. 10 shows the empty tail gate moved back to its original position and with all the containers moved into position in the cargo space with no open position.

Referring to FIGS. 7-10 it is shown how the containers PC may be moved in a circuitous direction. FIG. 7 shows an open space being provided in the right side. All the right side carriages 22 are moved rearwardly with one container PC being loaded on the split lift gate 46. This creates an open space. Referring to FIG. 8, the open space allows the system to move a carriage 22 to the open space at the front right hand corner of the cargo space. Referring now to FIG. 9, the split lift gate is moved transversely into position to align the tracks shown on the split rear gate into position in alignment with the left side tracks 34 while carrying the product container PC. In FIG. 10 it is shown that the open space at the left front corner has been filled by a container PC and the split lift gate has been moved back to its normal position.

As indicated above, the practical operation has been discussed above by using manual operations, manual switches, and a memory stored on a handheld computer by the operator or driver. It is to be understood, however, that the present invention may have an operating system that is completely computerized by using scanners, memories, drive connections and the like.

Also, as indicated earlier, the invention as described may also be adopted for box trucks and vans engaged in the package and grocery delivery industries. This adoption of the invention can be achieved by using a smaller multi-tiered track system, a smaller adjustable height lift gate, and by replacing the pallet carriages with a reduced size carriage box to accommodate packages and groceries.

Alternative Embodiment Features

FIGS. 18 and 19 illustrate various alternative features for embodiments of the invention. Referring first to FIG. 18, there is depicted an alternative track arrangement for support of pallets. Specifically, the track array comprised of a first longitudinal track 100, a generally parallel second longitudinal track 102 which together comprise a pair of guide tracks and support tracks for a pallet upon which product is supported. The tracks 100 and 102 are each comprised of bearings, such as roller or ball bearings, forming a longitudinal race the length of the truck trailer or enclosure 104. A second set of similar longitudinal tracks 106 and 108 are also comprised of bearings, or race bearings, and are positioned in a lateral parallel section of the trailer enclosure 104.

Transverse race bearing tracks 110 and 112 are arrayed at the enclosed end of the trailer enclosure 104 and comprise parallel tracks for pallet support and for transfer of pallets having packaging thereon between the longitudinal pallet storage and support sections of the trailer 104. The trailer enclosure 104 with this array of tracks comprises a series of modular pallet sections, such as sections 116, 118, 120 and the like formed along one side of the trailer enclosure 104 and a second set of pallet sized, modular storage support section or areas 122, 124 and 126. In practice, all of the modular sized sections 116, 118, 120, 122, 124 and 126 are substantially identical in plan view and are identical to the end support sections 128 and 130 at the interior end of the trailer vehicle 104. In this manner as previously discussed, pallets associated with the various modular sections may be moved in accord with the principles of the invention and likewise accessed in accord therewith.

With the disclosed array, the use of race bearings provides an easy alternative for moving a pallet supported on those bearings. Maintenance of the pallets in a particular location can be effected and retained by solenoid actuated locks, for example, locks 132 and 134 which may be electronically activated wirelessly. The locks 132 and 134 are positioned intermediate each of the pallet sections 124 and 126 by way of example. Of course, locks are typically provided with respect to all of the boundaries between the pallet sections such as 124 and 126 so that the pallets may be wirelessly locked into position within the trailer 104.

Pallets which are moved longitudinally along the various pathways defined by the tracks 100, 102, 106, 108, 110 and 112 are guided by guide blocks such as guide blocks 140 and 142 or guide locks 144 and 146. The guide blocks are strategically positioned along the pathway defined by the various tracks 100, 102, 106, 108, 112. Note that guide blocks are not necessarily positioned along the transverse track 110. However, a solenoid actuated guide block 150 may serve the dual function of a guide and a locking element in that circumstance.

Movement of pallets is effected by means of swivel mounted actuators which include a telescoping drive rod mechanism. For example, a swivel mounted actuator 160 is positioned in the middle of pallet location 130. The swivel mounted actuator may include a telescoping rod 162 oriented to push a pallet in either a lateral direction or a longitudinal direction as indicated by the arrows in FIG. 18. The actuator 160 thus includes a telescoping projecting rod or extension 162 which when actuated telescopes to first of all engage the lower side or bottom of a pallet positioned on the tracks 110 and 112 and then to extend it laterally or longitudinally. A similar actuator 164 is positioned in the pallet bay 128. Longitudinal actuators 162 may be positioned in any of the remaining bays. By way of example an actuator 166 may be positioned in a bay 117. Similarly an actuator 168 may be positioned in a bay 123. Further actuators may be positioned in any of the bays to facilitate movement of pallets. All of the actuators and solenoids may be wirelessly operated to effect their operation. Of course, the entire series of elements may be hardwired. With this embodiment, however, the construction is greatly simplified by use of the actuators, solenoids and guides as described.

The operation of the actuators, the number of actuators and their positioning may be arranged to provide the most efficient way in which to transfer pallets longitudinally and transversely. That is, FIG. 18 depicts actuators which move pallets longitudinally in only the end bays at the opposite ends of the trailer enclosure 104. The closed end of the trailer 104 includes the pivotal swivel actuators inasmuch as that is the position of the transverse guiderails. However, any arrangement of transverse rails, and longitudinal rails and numbers of actuators may be employed depending upon the desires of the manufacturer or the particular service requirements for the transport trailer. Note that the system is especially useful with pallets having a uniform and standardized size and construction compatible with the actuators, etc. On the other hand, the system lends itself to service with variously sized and manufactured types of pallets. In other words, the design of the actuators and the solenoids and guides facilitates the universality of the system.

Referring now to FIG. 19 and FIG. 19 taken in combination with FIG. 18, there is illustrated an additional feature of an embodiment of the invention and its benefits. Specifically, in FIG. 19, there is depicted a lift gate 180 which has a construction similar to that previously described. That is, the lift gate 180 is comprised of a single section equivalent in width to the width of one of the longitudinal channels associated with the vehicle trailer enclosure 104. The lift gate 180 thus may be shifted from side to side in a transverse direction of the arrows in order to receive pallets thereon.

The lift gate 180 further includes a lip or bracket 182 at its outer edge. The bracket 182 may be pivoted between an upward position as illustrated in FIG. 19 and a lowered or phantom position 184 as illustrated in FIG. 19 and other figures. A pallet may thus be placed upon the lift gate 180. The lift gate 180 may then aligned with an adjacent vehicle with the lift gate bracket or bar or lip 182 in the lowered position 184 so that a pallet may be easily shifted from one vehicle to another. The tilt of the lift gate 180 is thus controlled to enable the lift gate 180 to be appropriately positioned in opposition to a second vehicle. This arrangement provides significant advantages and a significant cost savings to trucking operations. Specifically, the trailer interchange mechanism can be utilized to create additional freight revenue which will be especially beneficial for smaller companies and owner operators which make up the vast majority of the trucking industry currently.

That is, many large carriers hire owner operators and small trucking companies to haul their freight. These owner operators are under contract to deliver product within a specified period of time, but the contracts do not prohibit the owner operators from taking on product from other sources, especially for return trips. As a consequence, there are very large freight forwarding companies that have nationwide networks that are in constant communication with shippers and carriers seeking product for delivery and delivery services throughout the nation. Having a large fleet of owner operators with the trailer interchange mechanism of the present invention and the various embodiments thereof including the pallet transfer system associated with the forwarding companies would be very beneficial.

An example illustrates the economic benefits associated with such an arrangement. That is, the owner operators are typically paid on a mileage basis for an outbound trip or on a percentage of revenue created by that trip. The path of a particular owner operator under contract intersects continuously the paths of other owner operators and parties needing to have goods shipped. Satellite communications link those drivers to a central communications control. The drivers in that circumstance can submit their itinerary and expected arrival and space availability terms after each delivery. In this way, their location and the space available on their truck is available at all times. As a consequence, those drivers may be efficiently directed to parties and shippers which require their services. As a further consequence, the carriage of product by trucks is being more efficiently utilized. Shippers will be able to have access to shipments in a faster, more efficient manner leading to significant cost savings as well as economic benefits to the owner operators.

While the foregoing has provided a detailed description of various embodiments of the present invention, it is to be understood that all equivalents recognized by those of ordinary skill in the art are to be encompassed within the scope of the invention as set out in the attached claims.

What is claimed is:

1. In a vehicle for shipping multiple cargo containers having various goods stored therein for dropping off at multiple locations, an enclosed cargo space carried by said vehicle, said cargo space having a front side, a pair of laterally spaced sides, and rear side movable between open and closed positions for movement of said cargo containers in and out of said open position of said cargo space, said cargo space further having a substantially horizontal floor enclosed between said front side, said laterally spaced sides, and said rear side, an improvement for said shipping vehicle, said improvement comprising, in combination, first and second elongated laterally spaced sets of tracks securely mounted along said floor, said elongated spaced sets of tracks being positioned along each of said side walls and extending from said front side to said rear side of said cargo space, transverse tracks spaced along said front side of said cargo space, said transverse tracks operatively interconnecting said first and second sets of laterally spaced tracks, multiple support carriages having upper and lower sides for supporting each of said cargo containers, each of said support carriages having multiple wheel assemblies secure to the lower sides of said carriages for supporting said cargo containers in a substantially upright position, said wheels being sized and shaped for a moveable position within said tracks, said carriages being movable within said tracks by engagement of said wheels within said laterally spaced tracks and within said transverse tracks, first and second drive mechanism operably positioned along said laterally spaced tracks, a third drive mechanism operatively positioned along said transverse tracks, a connection mechanism for operably interconnecting said support carriages to said first, second and third drive mechanisms, and a lifting mechanism for moving said carriages between a raised mobile position and a lowered immobile position whereby said carriages with said cargo containers and carriages, when in the raised mobile position, are moveable from one position to another position along said sets of laterally spaced tracks or said transverse tracks.

2. The vehicle of claim 1 further including a lift gate at the rear side of the floor.

3. The vehicle of claim 2 wherein the lift gate is pivotally mounted at the rear side of the floor about an axis.

4. The vehicle of claim 2 wherein the lift gate includes at least one set of spaced tracks aligned with at least one set of said sets of elongated tracks.

5. The vehicle of claim 3 wherein the lift gate includes at least one set of spaced tracks aligned with at least one set of said sets of spaced tracks.

6. The vehicle of claim 3 wherein the lift gate is mounted for transverse movement to the axis.

7. The vehicle of claim 6 wherein the lift gate further includes an outer edge with a retractable retention element.

8. The vehicle of claim 1 wherein in the first, second and third drive mechanism for the laterally spaced tracks and transverse tracks comprise a chain drive.

9. The vehicle of claim 1 wherein the first, second and third drive mechanisms for the first and second laterally spaced tracks and the transverse tracks comprise telescoping actuators.

10. The vehicle of claim 9 wherein the support carriages comprise pallets and the actuators are pivotally mounted to selectively engage a pallet of said pallets on said first and second set of laterally spaced tracks and said transverse tracks.

11. The vehicle of claim 10 further including locking elements located intermediate the tracks for selectively engaging and retaining a pallet of said pallets in a generally fixed position of a set of said tracks.

12. The vehicle of claim 11 further including a lift gate pivotally mounted at the rear of the floor for pivotal movement about an axis generally transverse to the elongated tracks between a generally horizontal position and a generally vertical position.

13. The vehicle of claim 12 wherein said lift gate includes at least one set of lift gate tracks aligned with at least one set of said elongated tracks and wherein said lift gate is sized to receive and support at least one pallet of said pallets on said lift gate tracks.

14. The vehicle of claim 13 wherein said lift gate is mounted for movement at the rear end transversely to said elongated tracks on said floor to provide movement of a pallet of said pallets between said sets of said elongated tracks.

15. The vehicle of claim 13 wherein said lift gate includes an outer edge with a retractable retention element.

16. The vehicle of claim 13 further including guide members located along the sets of tracks for guiding pallet movement along all said sets of tracks.

17. The vehicle of claim 16 wherein said guide members are selectively positionable.

18. The vehicle of claim 16 wherein said actuators, locking elements, guide members and all said sets of tracks are arrayed to define multiple adjacent, generally uniformly sized pallet location bays.

19. The vehicle of claim 18 wherein the pallet location bays comprise a first and a second series of adjacent bays extending along the first and second laterally spaced sets of tracks between the front and rear end of the floor and further wherein the transverse tracks are located at the front end of the floor intermediate bays of said first and second sets of tracks.

\* \* \* \* \*